United States Patent
Kusunoki et al.

[11] Patent Number: 5,936,257
[45] Date of Patent: Aug. 10, 1999

[54] THIN-FILM ELECTRON EMITTER DEVICE HAVING A MULTI-LAYER TOP ELECTRODE FOR SUPPRESSING DEGRADATION OF AN INSULATING LAYER AND APPLICATION APPARATUS USING THE SAME

[75] Inventors: Toshiaki Kusunoki; Mutsumi Suzuki, both of Kodaira, Japan

[73] Assignee: Hitachi, Ltd., Tokyo, Japan

[21] Appl. No.: 08/822,924

[22] Filed: Mar. 21, 1997

[30] Foreign Application Priority Data

Nov. 26, 1992 [JP] Japan .................................. 8-314502
Mar. 22, 1996 [JP] Japan .................................. 8-065831

[51] Int. Cl.$^6$ .................................................. H01L 29/06
[52] U.S. Cl. ........................... 257/10; 257/752; 257/761; 257/769; 313/311
[58] Field of Search ........................... 257/10, 751, 761, 257/763, 764, 767, 752, 769; 313/310, 311, 306

[56] References Cited

U.S. PATENT DOCUMENTS 5,702,281  12/1997  Huang et al. .............................. 257/10

OTHER PUBLICATIONS

Patent Abstracts of Japan, 07065710A, Mar. 10, 1995, Mutsuzou et al.
Patent Abstracts of Japan, 07226146A, Aug. 22, 1995, Mutsuzou et al.
Patent Abstracts of Japan, 2–306520A, Dec. 19, 1990, Kaneko.

*Primary Examiner*—Minh Loan Tran
*Attorney, Agent, or Firm*—Antonelli, Terry, Stout & Kraus, LLP

[57] ABSTRACT

A thin-film electron emitter device is provided with a multilayer structure including upper and lower electrodes with an insulative or dielectric layer being sandwiched therebetween. The upper or "top" electrode is itself formed as a multilayer structure. For example, in one embodiment, the upper electrode is formed as a three layer lamination of an interface layer formed on the insulative layer, an intermediate or "middle" layer stacked on the interface layer and a surface layer stacked on or above the middle layer. The middle layer is made of a chosen material which is greater in sublimation enthalpy than the surface layer and yet less than the interface layer. When appropriate, the surface layer may be omitted providing two-layer structure rather than the three-layer structure.

27 Claims, 12 Drawing Sheets

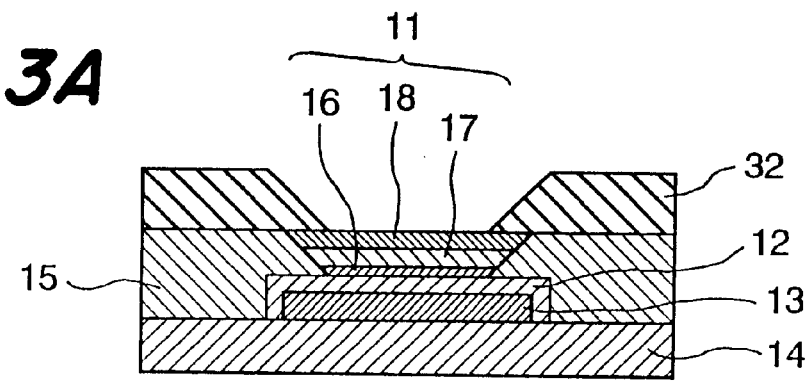
FIG. 3A
FIG. 3B
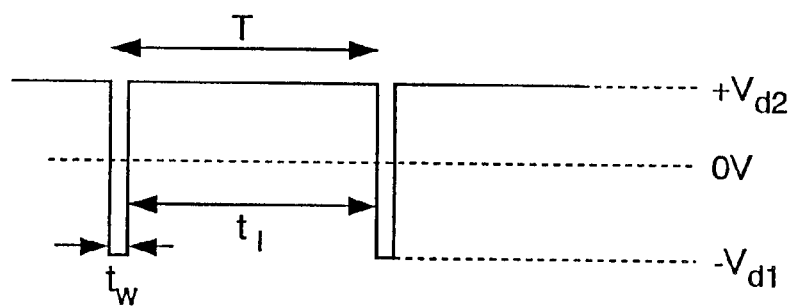
FIG. 4

FIG. 5
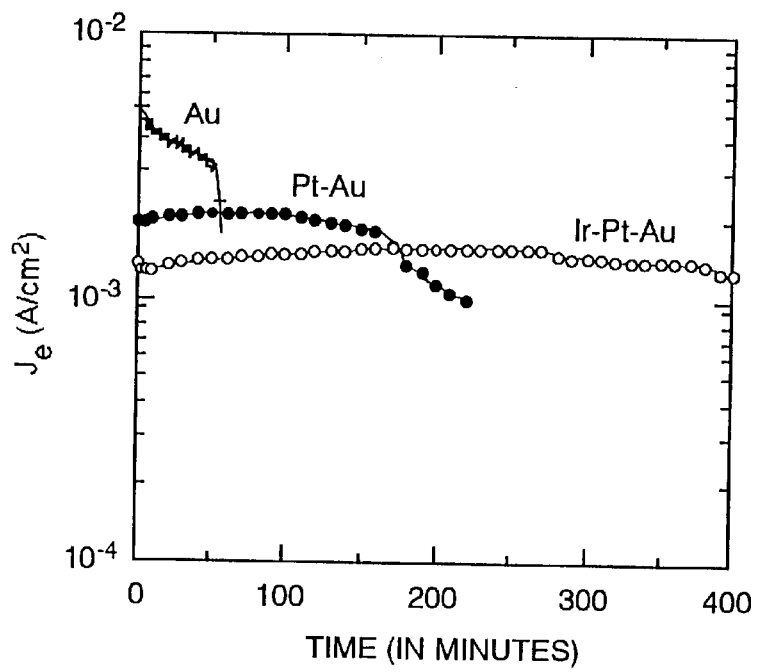
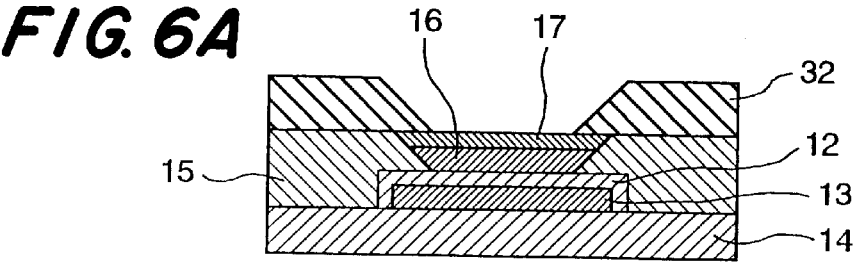
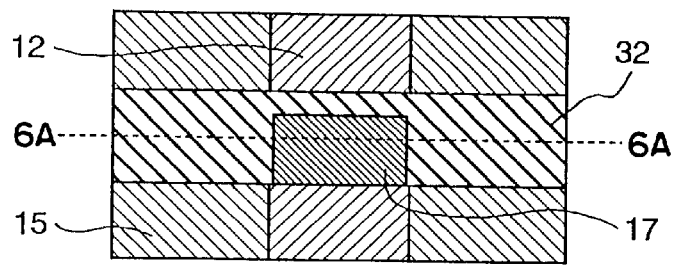

THIN-FILM ELECTRON EMITTER DEVICE HAVING A MULTI-LAYER TOP ELECTRODE FOR SUPPRESSING DEGRADATION OF AN INSULATING LAYER AND APPLICATION APPARATUS USING THE SAME

BACKGROUND OF THE INVENTION

1. Field of the Invention

The present invention relates generally to electron source modules adaptable for use in electronic equipment, and more particularly to multilayer thin-film electron emitter devices as well as application equipment employing the same. The invention also relates to metal-insulator-metal (MIM) or metal-insulator-semiconductor (MIS) three-layer thin-film electron emitters and their application equipment including, but not limited to, display apparatus and electron beam (EB) lithography apparatus.

2. Description of the Related Art

Conventionally, thin-film electron emitter modules come with three-layered structures such as the MIM structure or MIS structure consisting of the lamination of three thin films: an upper or "top" electrode, an intermediate or "middle" insulative layer, and a lower or "base" electrode. Upon application of an external potential between the top and base electrodes with the top electrode being positive in polarity, these MIM and MIS electron emitters operate to emit or liberate electrons from the surface of the top electrode into a vacuum. In the past, various types of electron emitters have been proposed, including those of the MIM type which employ metal for its top and base electrodes, and those of the MIS type making use of a semiconductor for at least one of these electrodes. One typical MIM electron emitter has been disclosed in, for example, Published Unexamined Japanese Patent Application (PUJPA) No. 7-65710.

Principally, the operation of thin-film electron emitters is as follows. Upon application of a drive voltage between the top and base electrodes while potentially setting an electrical field within an insulative or dielectric layer sandwiched therebetween at 1 to 10 megavolts per centimeter (MV/cm) or greater, electrons which reside near or around the Fermi level in the base electrode are potentially activated to penetrate by tunnel effect through a barrier entering by injection into the conduction band of the dielectric layer; thereafter, these electrons are accelerated to be further injected into the conduction band of the top electrode thereby behaving as so-called "hot" electrons. Of those hot electrons, certain ones which have energy greater than the work function $\phi$ of the top electrode are then released and emitted into the vacuum. By way of example, electron emission based on the above principle has been observed in a three-layer lamination electrode structure of $Au-Al_2O_3-Al$. This type of electron emitter offers in nature advantages as to performance and reliability. For example one advantage is that the electron emission characteristics will be substantially kept constant even when the work function $\phi$ varies due to occurrence of contamination on the surface of the top electrode caused by absorption of ambient gas therein. This leads to the exception that such devices are highly advanced electron emitters which will become more and more important in several applications.

Unfortunately, the prior art electron emitters are faced with a serious problem in that, due to the necessity of applying to the dielectric layer a relatively strong electric field the intensity of which is as high as 1 to 10 MV/cm, degradation will possibly occur in the dielectric layer resulting in the so-called "forming" phenomenon as taught by PUJPA No. 7-226146, for example. This, in turn, disadvantageously leads to occurrence and mixture of noises in the resultant flow of emitted electrons or "current" while simultaneously resulting in electrical failure or breakdown which can lead to destruction of thin-film electron emitters in the worst case.

The language "insulative of dielectric layer" used herein includes semiconductors if their resistivity is high enough to tolerate the high electric field. An example of such thin-film electron emitters consists of silicon for the base electrode, porous silicon for insulator, and metal for the top electrode, as is described in the Japanese Journal of Applied Physics, Vol. 34, Part 2, No. 6A, pp. L705–L707 (1995).

SUMMARY OF THE INVENTION

It is therefore an object of the present invention to provide a new and improved multilayer structure adaptable for use as basic lamination in electron emission source modules.

It is another object of the invention to provide electron source devices and apparatus employing the same capable of avoiding the problems faced by the prior art.

It is a further object of the invention to provide an improved thin-film electron emitter device capable of suppressing or eliminating degradation in insulative layer used therein as well as electronics application equipment employing the same.

The foregoing objects may be attained by the principles of the instant invention by providing specific multilayer thin-film structures including upper and lower electrodes with an insulative or dielectric layer being laid therebetween while letting the upper or "top" electrode be structured from a lamination of three layers—that is, a surface layer, intermediate or "middle" layer and an interface layer, in this order. Very importantly, the middle layer is made of a chosen material which is greater in sublimation enthalpy than that constituting the surface layer and yet less in sublimation enthalpy than the interface layer.

Where the top electrode remains sufficiently low in electrical resistivity, the surface layer will not always be required; in such cases, the top electrode may be in two-layer or double-layered structure essentially consisting of the interface layer and middle layer. The language "sufficiently low" as used herein may refer to a certain degree of resistivity which is determinable depending upon several design requirements as to the device structure of thin-film electron emitters, desired emission current density, real uniformity of electron emission, and the like. More specifically, it will be permissible that the electrical resistance of the top electrode is increased in value either with a decrease in net area thereof or with a decrease in emission current density as required. Alternatively, in situations where the area uniformity of emission current is not so material in the design requirement, a slight increase in resistivity of the top electrode may be permitted to some degree. In such cases, the resistivity of the top electrode is considered to be "sufficiently low" without having to employ the surface layer as formed thereon.

Preferably, the intermediate layer may be made of platinum (Pt) due to its inherent capability of being formed into a uniform, thin film as required.

One significant advantage of the present invention is that an improved thin-film electron emitter of the MIM or MIS type may be accomplished capable of being free from the risk of occurrence of degradation when operated for long-run use. This is because of the fact that the top electrode is specifically structured from a lamination of three layers of thin films, including the interface layer, middle layer and surface layer while causing the middle layer to be greater in sublimation enthalpy than the surface layer and yet less than the interface layer.

Another advantage of the invention is that enhanced emission current density can be attained with increased reliability and stability in any event due to optimization of the thickness of the interface layer.

Still another advantage is that in cases where the design requirements concerning retainment of increased conductivity of the top electrode are not so strict, the top electrode is allowed to comprise only two layers—namely, the interface layer and middle layer—with the surface layer not being necessary. Here, the middle layer is made of Pt whereas the interface layer is of a chosen material having sublimation enthalpy greater than Pt.

A further advantage of the invention is the thin-film electron emission devices thus arranged are adaptable for use in constituting several types of advanced electronics apparatus including, but not limited to, reduced-thickness high-resolution display panels thereby attaining enhanced illuminance characteristics while simultaneously increasing the life span and EB lithography apparatus thereby attaining high operation speeds as well as increasing lifespan thereof.

These and other objects, features and advantages of the invention will be apparent from the following more particular description of preferred embodiments of the invention, as illustrated in the accompanying drawings.

BRIEF DESCRIPTION OF THE DRAWINGS

FIG. 3A shows in cross-section a MIM electron emitter device in accordance with one preferred embodiment of the invention; and FIG. 3B depicts a plan view of the electron emitter.

FIG. 4 is one exemplary waveform of a drive voltage signal as applied to the electron emitter shown in FIGS. 3A and 3B.

FIG. 5 is a graph for demonstrating stability of emission current in the MIM electron emitter of FIGS. 3A–3B.

FIG. 6A shows a sectional view of a MIM electron emitter device in accordance with another embodiment of the invention; and FIG. 6B depicts a plan view of the same.

DETAILED DESCRIPTION OF PREFERRED EMBODIMENTS

Figure 1:
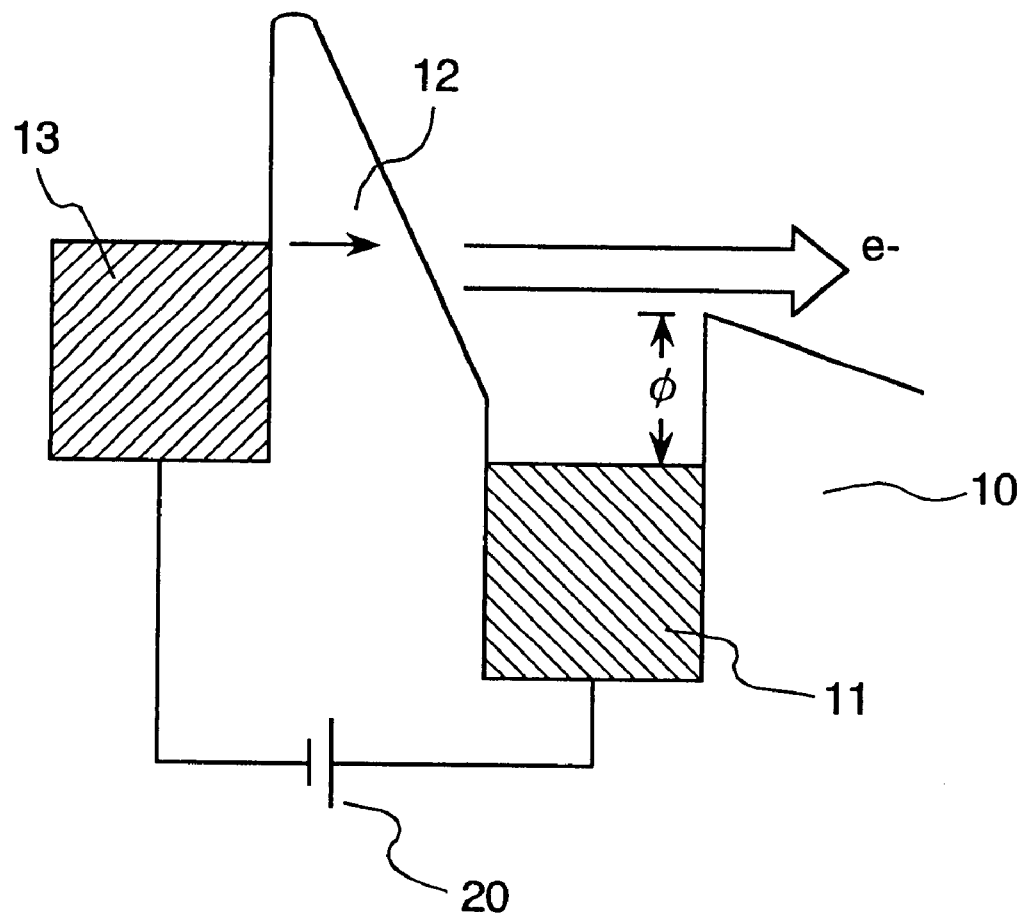
FIG. 1 is a diagrammatic representation for explanation of the operation in principle of a thin-film electron emitter.

Referring to FIG. 1, one typical thin-film electron emission source device is shown as a model for analyzing the principle of operation thereof for purposes of explanation only. As stated previously in the introductory part of the description, the thin-film electron emitter has a multilayer structure that typically consists of an upper or "top" electrode 11 and a lower or "base" electrode 13 with an insulative or dielectric layer 12 being sandwiched between them. The top and base electrodes 11, 13 are electrically coupled to an associated direct current (DC) voltage source unit 20 to receive therefrom a drive voltage. Upon application of such drive voltage between the top and base electrodes 11, 13 while setting the electrical field within the dielectric layer 12 at larger than 1 to 10 MV/cm, electrons that reside near or around the Fermi level in base electrode 13 attempt to pass through a potential barrier by tunnel effect rushing to flow by injection into the conduction band of dielectric layer 12. These electrons are then accelerated for further injection into the conduction band of the top electrode 11 acting as a packet of what is called the "hot" electrons. These hot electrons can contain therein specific ones which have an energy greater in work function $\phi$ than top electrode 11; if this is the case, such "active" hot electrons will be externally released or liberated into a vacuum as designated by numeral 10 in FIG. 1. Here, the efficiency of flow of emitted electrons or "current"—say, electron emission efficiency—may be determined by the ratio of a diode current Id flowing from base electrode 13 into top electrode 11 versus emission current Ie that is a current actually released toward vacuum 10, which efficiency Ie/Id may range from $10^{-3}$ to $10^{-5}$.

FIG. 3A shows a sectional view of a thin-film electron emitter in accordance with one preferred embodiment of the invention, which comes with the top electrode 11 having a three-layer structure of an interface layer 16, an intermediate or "middle" layer 17, and a surface layer 18. As shown, one characterizing feature of the electron emitter employing the invention lies in the fact that top electrode 11 is structured from the lamination of three layers: the interface layer 16, middle layer 17 and surface layer 18 as sequentially stacked on or above the underlying dielectric layer 12 in this order.

The interface layer 16 will first be described as follows in connection with the illustration of FIGS. 3A and 3B. With the illustrative embodiment of the invention, the interface layer 16 is made of a specifically chosen material having increased sublimation enthalpy $\Delta Hs$. The reason for such selection of high $\Delta Hs$ material is as follows.

As readily appreciated by a person skilled in the semiconductor art, it might be presumably considered that the mechanism for occurrence of degradation of the dielectric layer 12 upon application of a strong electric field thereto is based on the "electro-migration of the type in which the electrode-constituent atoms attempt by electric field to move or migrate into dielectric layers." This electromigration occurrence mechanism may be treated as a model in such a way that upon application of a positive voltage to top electrode 11, atoms constituting the same are forced, by an electric field created due to biasing, to sublime offering isolated atoms or atomic state, which may then be ionized by an electric field within dielectric layer 12 allowing resultant ions to move or migrate due to the presence of such electric field.

Accordingly, the greater the energy required for the constituent atoms of top electrode 11 to sublime (i.e., sublimation enthalpy ΔHs), the less likely the occurrence of degradation of dielectric layer 12. This is the very reason for employment of carefully chosen materials having increased sublimation enthalpy ΔHs for the interface layer 16 of top electrode 11.

Practically, as will be fully described in connection with FIG. 5 later, our experimentation demonstrated the fact that where several MIM electron emitters employing for top electrode 11 various kinds of materials are under measurement, the operation stability thereof increases with an increase in sublimation enthalpy ΔHs of material being in contact with dielectric layer 12.

Additionally, such electromigration creation mechanism has been discussed in more detail in, for example, Journal of Electrochemical Society, Vol. 133, No. 6, pp. 1242–1246.

A structure of the middle layer 17 is as follows. Generally, the interface layer 16 will no longer remain as any continuous film when its thickness is less than or equal to 3 nanometers (nm); it tends to grow as islands during crystallization. Interface layer 16 principally attempts to fill or bury any possible gaps between such islands thereby acting to prevent surface layer 18 from being brought into contact with dielectric layer 12. More specifically, in situations where surface layer 18 comprised of gold (Au) or equivalents thereof is directly laminated on interface layer 16 without middle layer 17 laid therebetween, Au atoms or ions of lower sublimation enthalpy ΔHs attempt to outdiffuse into dielectric layer 12 through gaps between film islands causing degradation of the thin-film electron emitter. To eliminate this outdiffusion, middle layer 17 is specifically provided which is greater in sublimation enthalpy Hs than surface layer 18. Table 1 below is presented to show the sublimation enthalpy ΔHs and electrical resistivity as well as other material characteristic values involved, with respect to various kinds of metals.

| Group | | ΔHs (kcal) | I.P. (eV) | Work Function (eV) | Resistivity (Ω-cm) |
|---|---|---|---|---|---|
| Ag | 1b | 67.9 | 7.574 | 4.28 | 1.61 |
| Al | 3b | 78.7 | 5.984 | 3.74 | 2.74 |
| Cu | 1b | 80.5 | 7.724 | 4.47 | 1.7 |
| Au | 1b | 88 | 9.22 | 4.7 | 2.2 |
| Fd | 8 | 90 | 8.33 | 4.82 | 10.55 |
| Ti | 4a | 112.3 | 6.82 | 4.09 | 43.1 |
| V | 5a | 122.9 | 6.74 | 4.11 | 19.9 |
| Rh | 8 | 133.1 | 7.46 | 4.65 | 4.78 |
| Pt | 8 | 135 | 9 | 5.29 | 10.42 |
| Th | 3a | 137.5 | — | 3.41 | 15 |
| Zr | 4a | 145.5 | 6.84 | 3.84 | 42.4 |
| Hf | 4a | 148 | 7 | 3.53 | 30.6 |
| Ru | 8 | 154.9 | 7.364 | 4.52 | 7.37 |
| Mo | 6a | 157 | 7.1 | 4.27 | 5.33 |
| Tc | 7a | 158 | 7.28 | — | — |
| Ir | 8 | 160 | 9 | 4.57 | 5.07 |
| Nb | 5a | 172.4 | 6.88 | 3.99 | 14.5 |
| Ta | 5a | 186 | 7.88 | 4.12 | 13.1 |
| Re | 7a | 186.1 | 7.87 | 5.1 | 18.6 |
| Os | 8 | 189 | 8.7 | 4.55 | 9.13 |
| W | 6a | 203.4 | 7.98 | 4.5 | 5.33 |

As can be seen from Table 1 above, materials with high sublimation enthalpy ΔHs tend to exhibit relatively high electrical resistivity.

Figure 2:
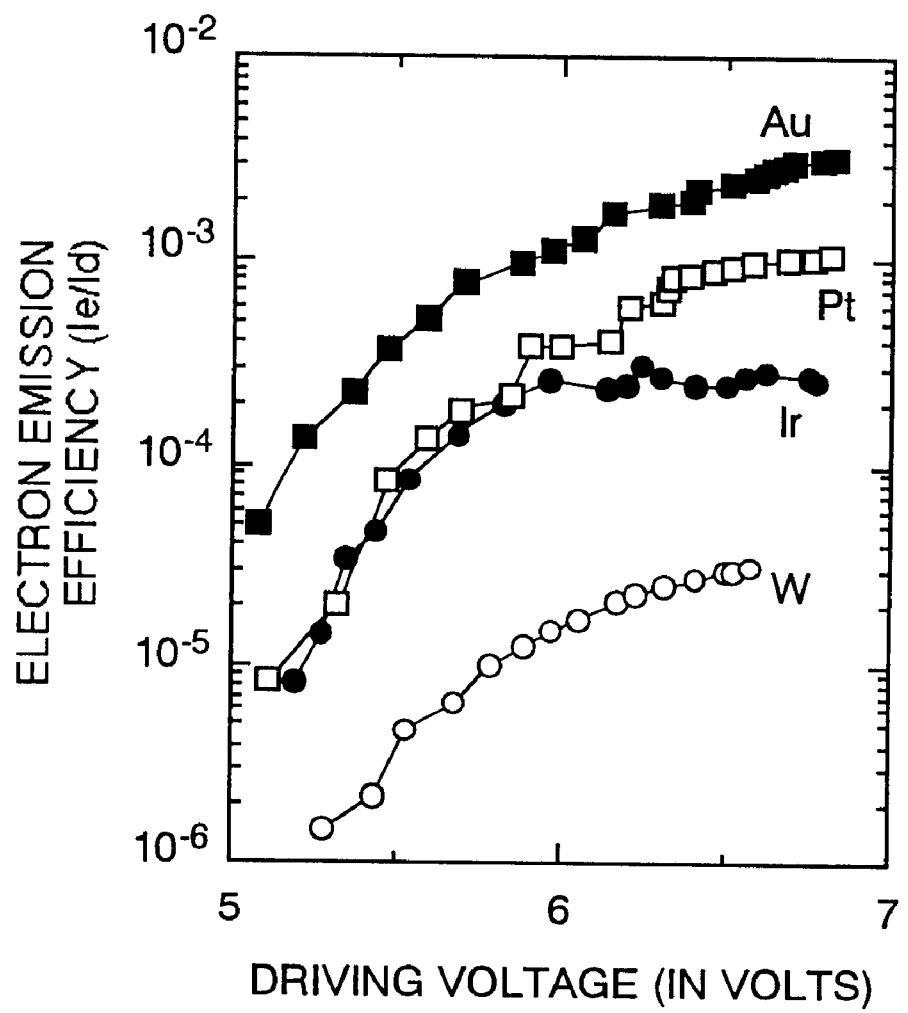
FIG. 2 is a graph showing the relation of the electron emission efficiency of the thin-film electron emitter versus drive voltage demonstrating the dependency of the former upon top-electrode materials.

FIG. 2. is a graph showing certain experimental results which demonstrates the relation of the electron (current) emission efficiency Ie/Id versus a drive voltage in the electron emitter in accordance with the illustrative embodiment making use of the top electrode 11 consisting of lamination of an interface layer 16 which is 3-nm thick and Au-surface layer 18 which is 6-nm thick. In this graph, as a comparative example, the same relation is also shown for an electron emitter having its top electrode consisting of an Au film which is 9-nm thick only. The interface layer 16 of each sample here may be made of tungsten (W), iridium (Ir), or platinum (Pt). The dielectric layer 12 measures 5.5 nm in thickness. Dielectric layer 12 and top electrode 11 remain constant in thickness through all samples concerned, thereby to ensure that any possible differences in electron emission efficiency between or among samples successfully reflect the difference in transmittance of hot electrons among respective films each being contacted with dielectric layer 12—that is, the W-, Ir-, Pt- and Au-films of 3-nm thickness. Upon application of a drive voltage of 6.5 volts (V), the electron emission efficiency Ie/Id was such that Au (9 nm) offers a maximum value of 0.3%, Pt(3 nm)-Au(6 nm) is 0.1%, Ir(3 nm)-Au(6 nm) is 0.03%, and W(3 nm)-Au(6 nm) is 0.005%. This shows that the electron emission efficiency Ie/Id decreases in percentage value with a decrease in the group number of metals in the atom's periodic table. This tendency is originated from the fact that the hot electron's transmittance with respect to the top electrode of the electron emitter is determined by electron-electron scattering which has occurred inside metals. Because of the principle of energy conservation, the cross-section of the electron-electron scattering increases as the density of states of the top electrode increases. More specifically, when the kinetic energy of the hot electron is $E_0$ (measured in reference to the Fermi level of the top electrode), the scattering cross-section is mainly determined by the density of states integrated in the energy range from $-E_0$ to $E_0$. The density of states in the vicinity of the Fermi level is mainly determined by how the d orbitals, which are localized in energy, are occupied in the metal, thereby it depends on the metal's electron configuration. The density of states near the Fermi level, and thus the scattering cross-section change in the ascending order: groups 1b and 2b<group 8<group 7a<groups 6a, 5a, 4a, and 3a in the periodic table. Typically, certain metals high in sublimation enthalpy ΔHs belong to transition metals covering from 3a to 8 groups, which remain less in electron emission efficiency Ie/Id than 1b-group metals such as gold (Au), silver (Ag) copper (Cu), and the like. The illustrative electron emitter device employing the invention has a specific film lamination structure with such middle layer laid between the upper and lower electrode layers.

One possible approach to attain high emission current Ie is rendering the interface layer 16 thinner. The transmittance of hot electrons inside metallic thin-films may be represented by $\exp(-d/\lambda)$, where d is the thickness of a metal thin film, and $\lambda$ is the mean free path of hot electrons. As a consequence, if the thickness of the foregoing interface layer 16 is rendered thinner to measure 1 nm, by way of example, then resultant hot electron's transmittance may increase by approximately seven, to eight times than ever. Hence, where the Ir(1 nm)-Au(6 nm) stacked structure is employed for top electrode 11 rather than the Ir(3 nm)-Au(6 nm) stacked structure as used in the structure of FIG. 2, the resulting electron emission efficiency Ie/Id is from 0.2 to 0.25%, which may be substantially the same as that of the Au(9 nm) metal. Alternatively, with the use of W(1 nm)-Au(6 nm) alloy, Ie/Id may increase up to 0.035 to 0.04%. Apparently, the less the thickness d of metal thin film, the greater the electron emission efficiency Ie/Id. In this way, even in cases of employing metal films of relatively high sublimation enthalpy ΔHs such as Ir, W or the like, the electron emission efficiency Ie/Id problem may be successfully avoided by rendering the film thickness d reduced. In such cases, while the interface layer 16 tends to grow into islands, degradation is not likely to take place in the resultant thin-film electron emitter due to the presence of the middle layer 17 between the top electrode 11 and base electrode 13, as best illustrated in FIG. 3A.

Note here that Pt is more preferable for the middle layer while the same has been employed for the middle layer 17 in the experimentation of FIG. 2. As readily seen from FIG. 2, Pt is less than Mo and Ir in possibility of occurrence of hot electron's scattering. Moreover, Pt exhibits an inherent characteristic that it tends to uniformly grow even when much reduced in thickness; consequently, this advantageously serves to prevent the surface-layer material from being accidentally brought into contact with the underlying dielectric layer 12 due to the fact that Pt resides between or among gaps of island-like grown interface layer 16.

The description is now directed to certain cases that do not require formation of the surface layer 18. By way of example, consider the case where a layer for defining therein electrical lead wires for exclusive use as power supply lines (say, bus lines) is arranged so as to be in physical contact with the top electrode 11 in order to supply it with necessary power supply voltage, thereby moderating or softening technical requirements as to electrical resistivity for top electrode 11.

It should be noted that one prior known two-layer structure for the top electrode has been disclosed in, for example, PUJPA No. 2-306520, wherein two layers are sequentially laminated on the dielectric layer 12 as follows: a first layer formed on and in contact with the dielectric layer, and made of a negatively ionizable material such as aluminum (Al), cadmium (Cd), lead (Pb), or the like; and, a second layer being stacked on the first layer and made of chemically stable material against microelectronics fabrication processes such as silver (Ag), molybdenum (Mo), tantalum (Ta), chromium (Cr), and gold (Au). Unfortunately, this prior art approach disclosed therein is encountered with a problem that the material selected to constitute the first layer remains less in sublimation enthalpy ΔHs—such as 78.7 kilo-calories (kcal) for Al, 26.7 kcal for Cd, and 46.78 for Pb—and more seriously, the aforesaid material is even less in sublimation enthalpy than Au (88 kcal) which is one of materials preferably employed for the second layer and yet is the representative one for preferable use as the surface layer 18 in accordance with the illustrative embodiment of the invention. This may render the present invention patentably distinguishable in principal concept over the prior art mentioned above.

Attention should be paid to the fact that the thin-film electron emitter is widely adaptable for use in various types of electronics applications including, reduced-thickness high-resolution display apparatus, electron-beam (EB) photolithography apparatus and others. In regard to such application apparatus or equipment, since the thin-film electron emitter is capable of stably emitting a flow of electrons or current of high density while simultaneously permitting accomplishment of an array of rows and columns of electron emitters; accordingly, long life span and high luminance characteristics may be attained for both the display apparatus and EB lithography apparatus.

One example is that the thin-film electron emitter application apparatus is arranged by use of a substrate having thereon a two-dimensional (2D) or real array of electron emitters, which substrate is laminated with a face plate (referred to as the "front plate" hereinafter) having phosphors deposited on the surface thereof while sealing resultant laminated structure into vacuum environment.

Another example is that the thin-film electron emitter application EB lithography equipment includes a three-layer structured thin-film electron emitter module, as the electron source, and an electron lens operatively associated therewith. In this case, the electron emitter module may include a substrate having a surface on which multiple thin-film electron emitter devices are arrayed in a 2D or real matrix fashion, thereby offering capability of simultaneous transfer of an intended integrated circuit (IC) pattern onto a target wafer.

Several embodiments of the invention will now be fully described with reference to the accompanying drawings.

First Embodiment

Referring now to FIGS. 3A and 3B, a main part of a thin-film electron source is shown which will be called the "electron emitter" hereinafter. FIG. 3B shows a plan view of the electron emitter whereas FIG. 3A depicts a corresponding cross-section of it taken along line A–B in FIG. 3B. The electron emitter includes an insulative substrate 14 which is made of glass, or the like. The glass substrate 14 has a surface on which a conductive film 13 which may be aluminum (Al) is formed to a predetermined thickness of, for example, 100 nm. This Al film acts as a lower or "base" electrode. Here, radio-frequency (RF) magnetron sputtering techniques may be employed to form the Al base electrode film 13. Al film 13 is then subject to anode-oxidizing or anodization treatment on its exposed surface forming thereon an insulative or dielectric layer 12 to a thickness of 5.5 nm. The anodizing current for such anodization is limited in value enabling retainment of enhanced film quality for dielectric film 12. Then, a chosen dielectric material such as $SiO_2$, $Al_2O_3$ or the like is deposited by RF-magnetron sputtering techniques to a thickness of 50 nm providing a protective layer 15. Subsequently, another Al film is continuously formed by similar sputtering techniques in a vacuum atmosphere providing an upper or "top" electrode of three-layer lamination structure. At this time, three films are sequentially formed: an Ir film of 1-nm thick as an interface layer 16; a Pt film of 2-nm thick as an intermediate or "middle" layer 17; and an Au film of 3-nm thick as a surface layer 18. The resultant three-layer lamination structure measures 6 nm in thickness as a whole. Finally, a patterned Au layer is formed providing a bus line pattern 32 for the top electrode 11.

Then, the resultant structure is placed in a vacuum chamber (not shown) at a selected degree of vacuum of $10^{-7}$ Torr for application of a pulse voltage to the base electrode 13 with top-electrode bus lines 32 being grounded in potential, thereby insuring the operation stability. As shown in FIG. 4, the pulse voltage used includes a train of pulse components of negative polarity at constant intervals t1 with a repeat period T, each of which has a potential level of $-Vd1$ set at $-9$ V and its pulse width tw being set at 64 microseconds (s). Here, each interval t1 between adjacent pulses may be 16.54 milliseconds (ms). In other words, first apply a pulsate voltage of $-Vd1=-9$ V for preselected pulse width tw=64 s; then apply a voltage of $Vd2=0$ V for a time period of 16.54 ms. This pulse cycle will be repeated with period T=16.6 ms. Note that the repeat period T and pulse width tw may be modified in value as required; for instance, period T may range from 2 s to 1000 ms whereas tw=1 s to 500 ms. In this respect, as taught by the PUJPA No. 7-226146, supra, the MIM electron emitter will be further improved in stability by modifying the voltage Vd2 to positively shift in potential falling within a range of Vd2=+1 to +5 volts.

FIG. 5 is a graph showing an aging-test measurement result which demonstrates the relation of peak-emission current density Je of the resultant MIM electron emitter embodying the invention versus time elapsed, as labeled "Ir-Pt-Au" in FIG. 5. For a comparison, other emitter samples were also subject to a similar aging test: one is with a two-layer laminated top electrode structure consisting of a Pt interface layer of 3-nm thick and Au-surface layer of 3-nm thick, as labeled "Pt-Au"; the other, labeled "Au," is with a single-layered top electrode structure consisting of Au film of 6-nm thick only. For these three different MIM electron emitters, an application voltage was set at fixed levels to ensure that diode current Id is kept constant among them; and simultaneously, electric field being applied to dielectric layer 12 of each sample is identical to those of the others. As can be readily seen by a person skilled in the art from the graph of FIG. 5, with the Au single-layer structure, while the current density Je is initially high in value due to the significance of its electron emission efficiency Ie/Id, Je tends to decrease with time, and, after 50 minutes has elapsed, electron emission finally ceases. With Pt-Au two-layer structure, while the initial peak emission current density Je is high as 2 milliamperes per square centimeter (mA/cm$^2$), it steeply drops down after the elapse of approximately 400 minutes. In this way, the Pt-Au two-layer structured top electrode is provided with extremely enhanced life-time characteristics as compared with the Au single-layered top electrode; however, especially where higher emission current is required, sufficient life-time characteristics are not attainable any more. In contrast, with the Ir-Pt-Au three-layer structure embodying the invention, since the interface layer 16 is specifically comprised of Ir, its initial peak emission current density Je remains relatively low at about 2.5 mA/cm$^2$. As such, the stability is dramatically improved with the result of no decrease in emission current density Je being observed even after 400 minutes has elapsed. This is because the use of Ir—which is higher than Pt in sublimation enthalpy—for interface layer 16 advantageously serves to further suppress occurrence of unwanted migration of the atoms constituting top electrode 11 toward dielectric layer 12.

It should be noted in this embodiment that the characteristics of dielectric layer 12 as formed by anodization is further improved by use of high orientation films or single-crystalline films for the base electrode 13, leading to accomplishment of extra-high performance MIM electron emitters. In addition, dielectric layer 12 may alternatively be formed by sputtering or deposition techniques rather than anodization.

It should also be noted that while the foregoing is drawn to one specific embodiment with the interface layer 16 made of Ir, similar advantages will be attained if interface layer 16 is of other, higher sublimation-enthalpy materials such as zirconium (Zr), hafnium (Hf), ruthenium (Ru), molybdenum (Mo), niobium (Nb), tantalum (Ta), rhenium (Re), osmium (Os), tungsten (W) or an alloy of plural elements as selected therefrom in cases where the middle layer 17 is comprised of Pt.

Second Embodiment

In the first embodiment set forth above, the surface layer 18 will not necessarily be formed; this layer 18 is not required where the top electrode 11 per se exhibits "sufficiently" low electric resistivity without presence of surface layer 18. A second embodiment shown in FIGS. 6A and 6B follows this approach, wherein FIG. 6B is a plan view whereas FIG. 6A is a cross-section thereof along line A-B. As shown in FIG. 6A, the illustrative thin-film electron emitter is structured from a lamination of interface layer 16 and middle layer 17 on dielectric layer 12. In this case, resultant electric resistivity of top electrode 11 is increased to be greater than that of the first embodiment, supra. To compensate for this, top electrode 11 is electrically coupled via bus lines 32 to associative power-supply terminal nodes avoiding any problems otherwise possibly arising when top electrode 11 is high in resistivity to some extent.

Third Embodiment

Figure 7:
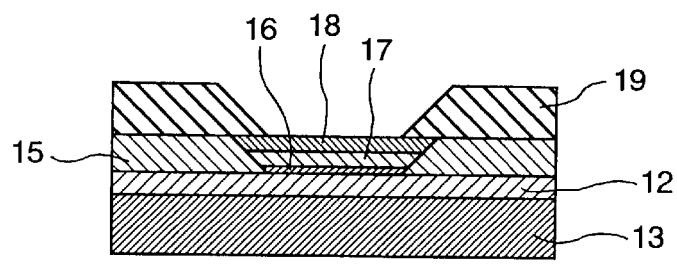
FIG. 7 illustrates in cross-section a MIM electron emitter device in accordance with a still another embodiment of the, invention.

A MIS electron emitter in accordance with a third embodiment of the invention is shown in FIG. 7. As shown, an n-type silicon (Si) substrate is subject to oxidization by thermal anodization techniques, forming dielectric layer 12 thereon. Then, a SiO$_2$ film is deposited by chemical vapor deposition (CVD) or sputtering techniques to a specified thickness, for example, 50 nm, providing a protective layer 15. Next, a three-layered top electrode 11 is sequentially formed and laminated by RF-magnetron sputtering thereon. Formation of three films during this process is as follows: an Ir film of 1-nm thick as interface layer 16; a Pt film of 2-nm thick is as middle layer 17; and an Au film of 3-nm thick as surface layer 18. Resultant three-layer lamination is 6 nm in thickness as a whole. Finally, a patterned Au layer is formed providing the bus line pattern 32 for top electrode 11.

An explanation will now be given of application equipment employing one or several thin-film electron emitters embodying the invention.

Fourth Embodiment

Figure 8:
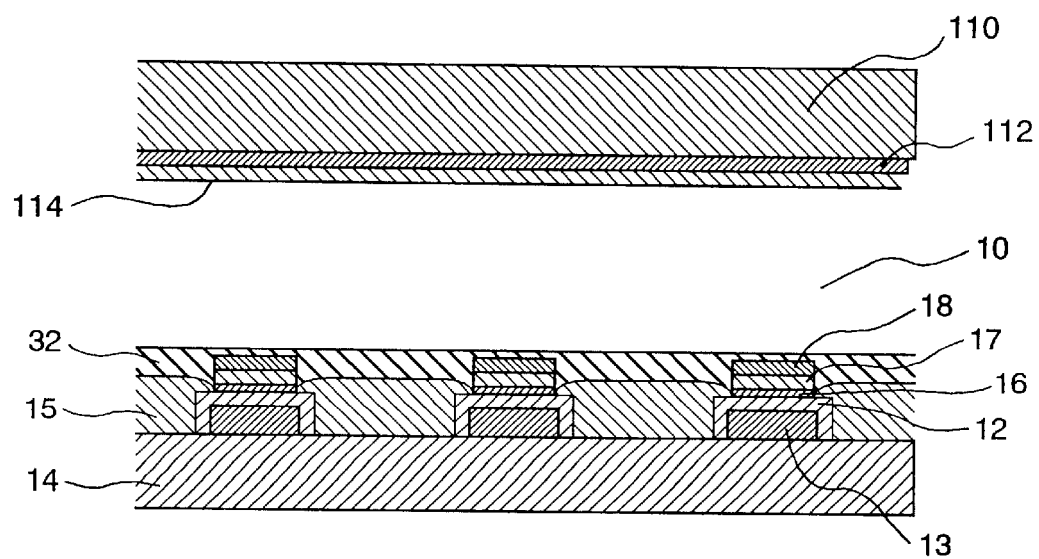
FIG. 8 shows a sectional view of a display device in accordance with a yet another embodiment of the invention.
Figure 9:
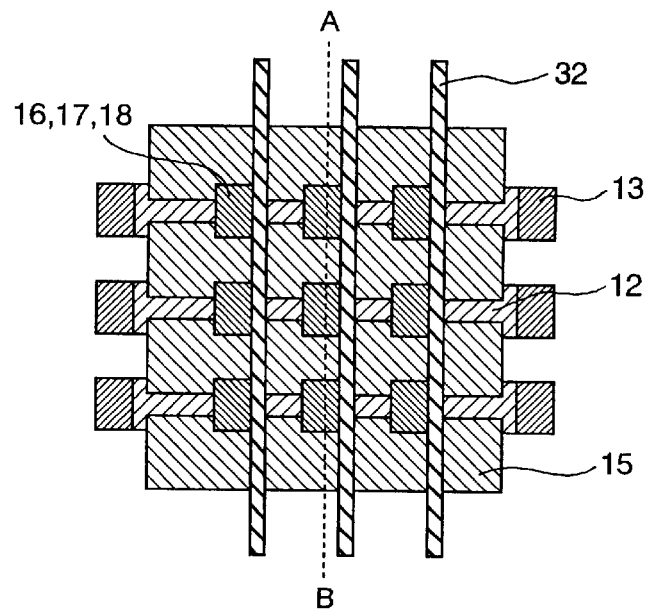
FIG. 9 depicts a planar structure of the display device shown in FIG. 8.

FIGS. 8 and 9 illustrate one embodiment of a display apparatus using the present invention. FIG. 8 shows a cross-section of a planar structure shown in FIG. 9, which is a plan view of an array of rows and columns of electrodes of electron emitters on an insulative substrate of the display apparatus. The substrate is not visible in FIG. 9 and is indicated by numeral 14 in FIG. 8B. The substrate 14 may be a glass substrate on which base electrode 13 is formed by an RF sputtering method. During this process, patterning is performed as shown in FIG. 9 by use of an appropriate mask or a combination of photolithography and etching techniques. Subsequently, the dielectric layer 12 is formed by anodization. Next, protective layer 15 of a chosen dielectric material, here SiO$_2$, is formed by RF-sputtering. Protective layer 15 functions to enhance the device life span by eliminating occurrence of dielectric breakdown which would otherwise take place due to local concentration of electric field at side edges or corner portions of base electrode 13.

Next, sputtering is carried out sequentially forming three laminated films for top electrode 11. At this time, an Ir film of 1-nm thick is formed as interface layer 16; a Pt film of 2-nm thick is as middle layer 17; and an Au film of 6-nm thick as a surface layer 18. Resultant three-layer lamination is thus 9 nm in thickness as a whole. As shown in FIG. 9, each lamination of the interface layer 16, middle layer 17 and surface layer 18 is selectively formed only at a corresponding one of intersections with base electrode 13. Subsequently, a chosen high-conductivity material, such as Au, is formed to a thickness of 500 nm, thus having certain pattern shown in FIG. 9B. Resultant film patterned is used as top-electrode bus lines 32. As shown in FIG. 9B, the width of each bus line 32 is forced to be less than that of the top electrode 11 consisting of layers 16–18 at any locations other than top electrode 11, whereby it becomes possible to reduce inherent stray capacitance between top-electrode bus lines 32 and base electrodes 13 enabling achievement of high-speed device operations.

As shown in FIG. 8, a front plate 110 is made a rigid transparent material, such as glass, and has its inner surface on which an insulative transparent acceleration electrode 112 of indium-tin-oxide (ITO) is entirely formed by sputtering. A phosphor film 114 is coated by deposition on the ITO acceleration electrode 112. Phosphor film 114 may be made of a specific material capable of exhibiting high luminance or brightness efficiency even for low-energy electron beams used—ZnO:Zn is preferable. Front plate 110 with accelerator electrode 112 and phosphor film 114 on its inner surface is assembled with display substrate 14 having thereon an array of electron emitters by use of a certain spacer (not shown) of 200-m thick which surrounds the periphery thereof; then, the resultant structure is sealed using frit glass. An inner space defined between the substrate 14 and front plate 110 is next vacuumed completing the display panel 100 of display apparatus.

Figure 10:
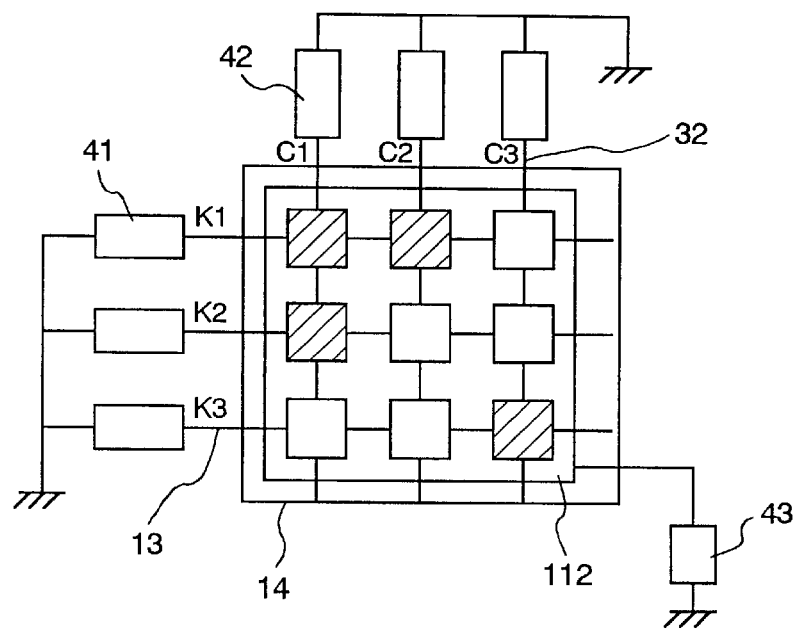
FIG. 10 is a circuit diagram of electrical driver circuitry as employed in the display device shown in FIG. 8.

Electrical circuitry of the display panel 100 thus manufactured as operatively coupled to an associative driver circuit is shown in FIG. 10. The base electrodes 13 are connected to base-electrode driver circuits 41 whereas top-electrode bus lines 32 are tied to top-electrode driver circuits 42 respectively. The acceleration electrode 112 is operatively coupled to an acceleration-electrode driver circuit 43. Note that one dot at an intersection between the n-th base electrode 13–say, Kn—and m-th top-electrode bus line 32Cm will be represented by (n, m) hereinafter, where "n" and "m" are integers.

Figure 11:
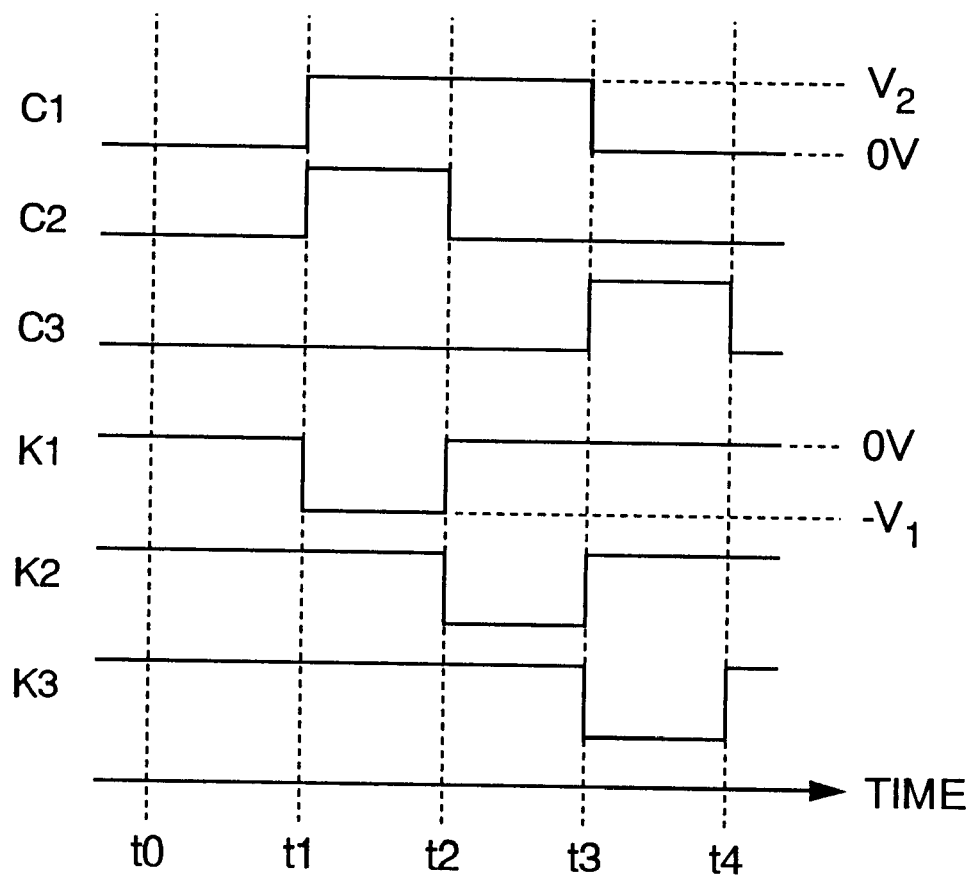
FIG. 11 is an illustration of a timing diagram showing the pulse sequence of drive voltage signals for operation of the display device of FIGS. 8–10.

FIG. 11 shows waveforms of several major voltage signals as generated at nodes of respective driver circuits. Although not specifically indicated in this waveform diagram of FIG. 11, a voltage of 400 V is constantly applied to the acceleration electrode 112.

As can be seen from FIG. 11, each electrode is at zero volts at a time point t0 resulting in no electrons being emitted therefrom; accordingly, the phosphor film 114 emits no rays of light.

At time t1 of FIG. 11, one base electrode 13K1 is applied with a voltage of $-V_1$ whereas top-electrode bus lines 32 as indicated by C1 and C2 receive a voltage of $+V_2$. A certain voltage $(V_1+V_2)$ is applied between the base electrodes 13 and top electrodes 11 of dots (1, 1) and (1, 2); therefore, setting of this voltage $(V_1+V_2)$ at a predefined potential higher than the electron emission start potential may allow these two thin-film electron emitters to emit or liberate electrons into the vacuum space 10 of display panel 100. Electrons emitted are then accelerated by the voltage being applied to acceleration electrode 112 hitting phosphor film 114 to let it emit light.

Then, at time t2 of FIG. 11, a voltage $-V_1$ is applied to the base electrode 13K2 while simultaneously applying voltage $V_2$ to a top-electrode bus line 32C1 causing a dot (2, 1) to turn on and emit light. Applying a set of the voltage waveforms of FIG. 11 in this way enables some selected dots with hatching in FIG. 10 to exclusively turn on.

In the way as set forth above, it becomes possible to display any desired images or information by changing or modifying the signals being applied to top-electrode bus lines 32. Also, It is possible to visually indicate multiple gray-scale images by suitably changing the intensity of voltage signal $V_1$ applied to top-electrode bus lines 32 depending upon an image signal required.

With use of the thin-film electron emitters embodying the invention, high-brightness/long-life display panels can be manufactured because of the fact that enhanced emission current density can be attained with increased stability and reliability.

Fifth Embodiment

Figure 12A:
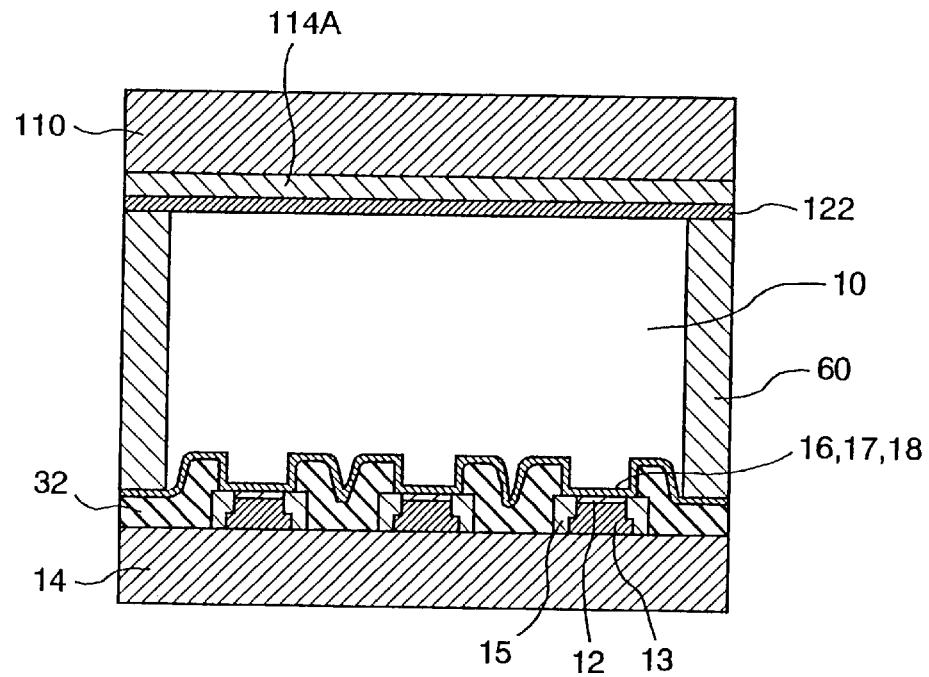
FIGS. 12A and 12B each depict a sectional view of a display device in accordance with a further embodiment of the invention.
Figure 12B:
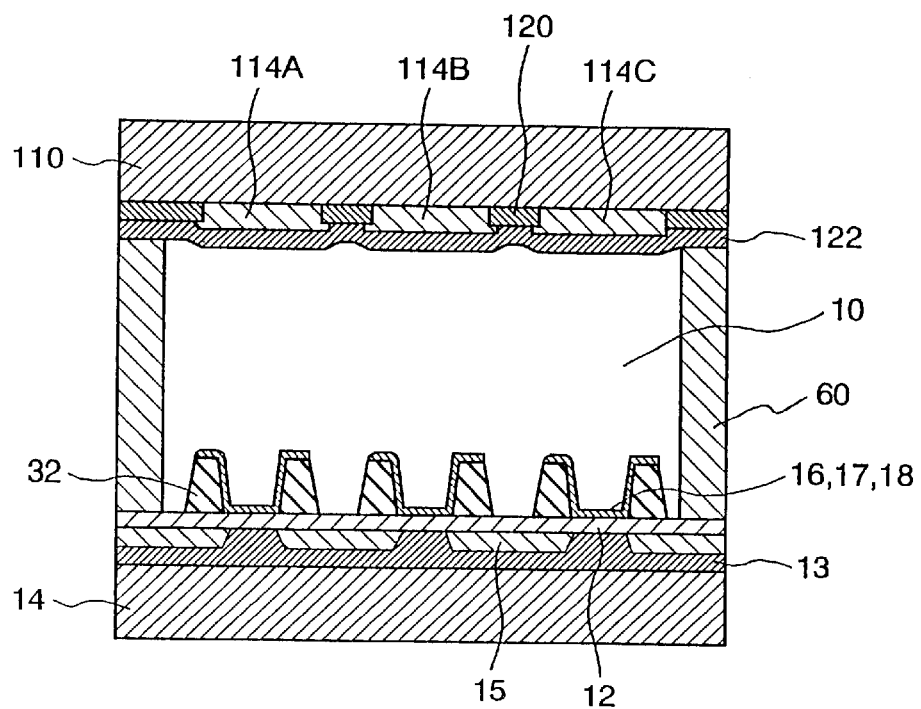
Figure 13:
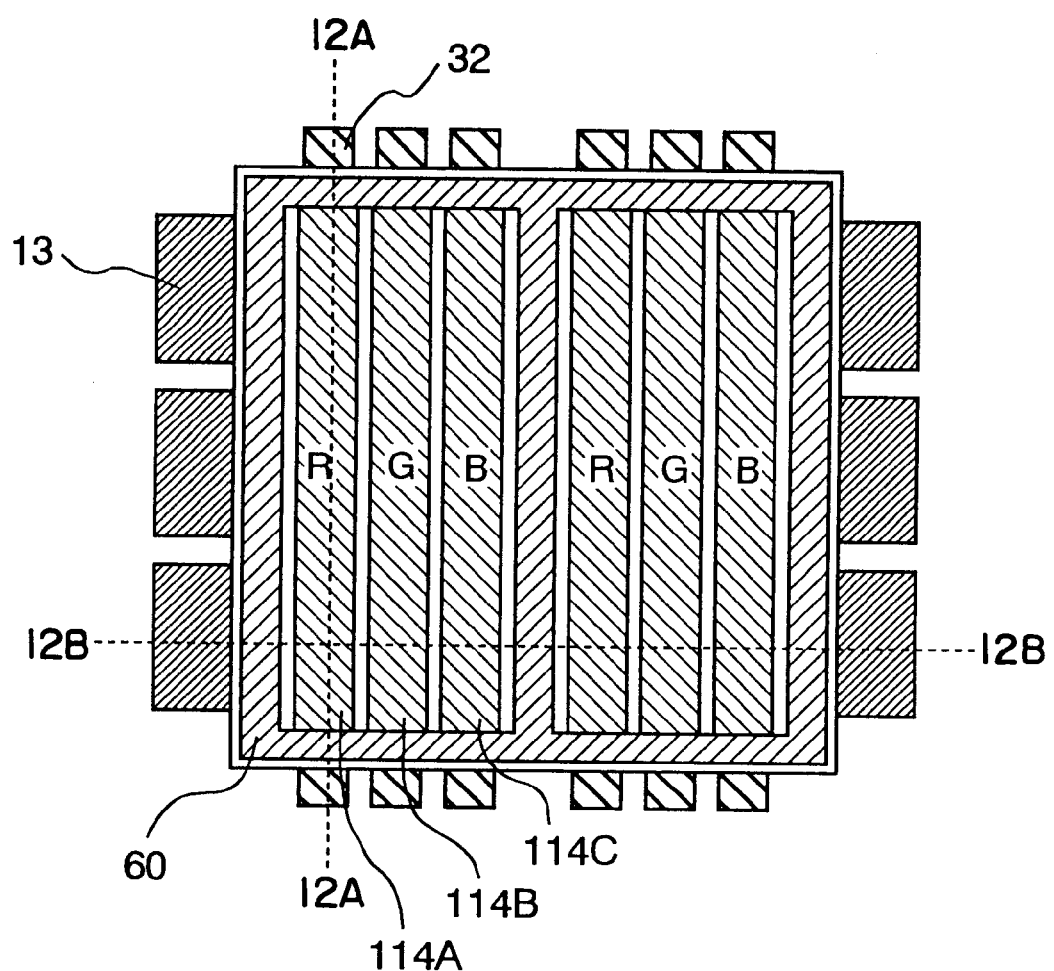
FIG. 13 is a plan view of the display device of FIGS. 12A–12B for showing the phosphor plane position thereof.
Figure 14:
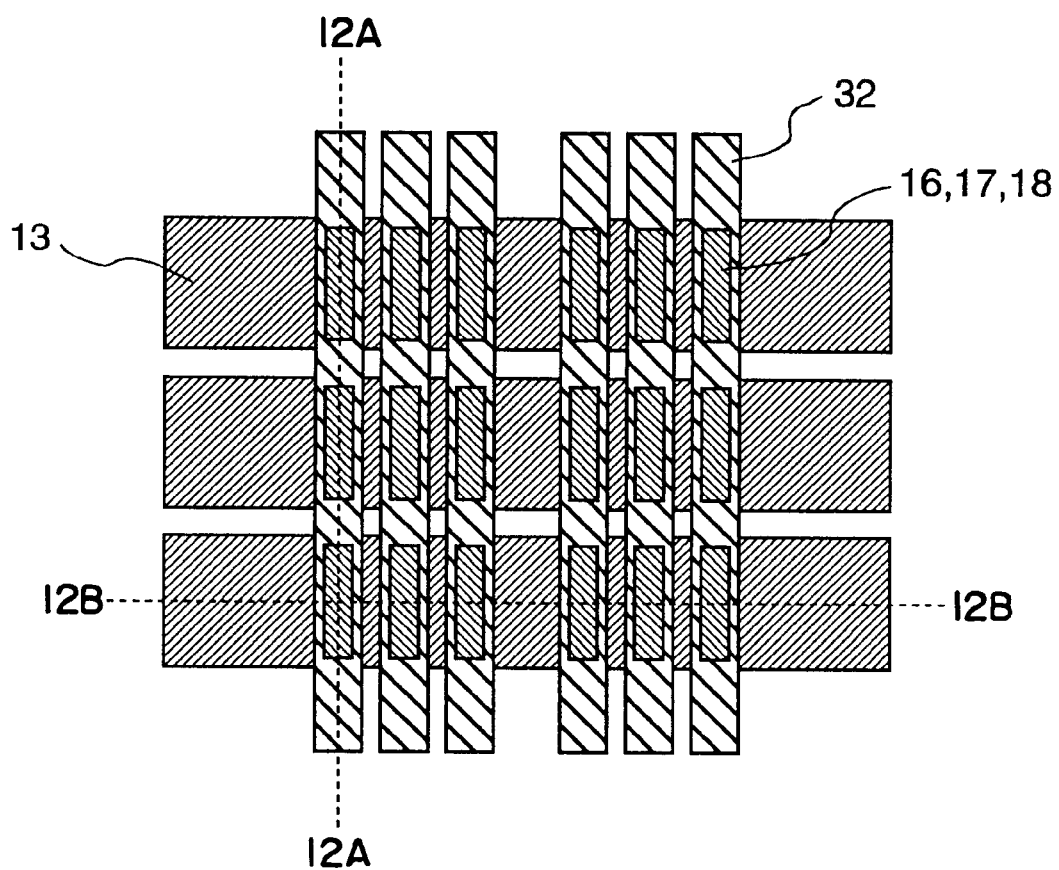
FIG. 14 illustrates another plan view thereof.

Other examples employing the principle of the present invention will now be described in connection with FIGS. 12–15. FIG. 13 is a plan view of a display panel as looked at from the face-plate side thereof, whereas FIG. 14 is a plan view of a display substrate 14 as viewed from its face-plate side. A cross-sectional view of each of the structures of FIGS. 13 and 14 as taken along line A-B is shown in FIGS. 12A whereas a cross-section along line C-D is illustrated in FIG. 12B with respect to the left-hand half portion thereof.

A manufacturing method of thin-film electron emitters to be formed on the display substrate is as follows. FIGS. 15A through 15G depict some of major steps in the manufacture of such thin-film electron emitters on display substrate 14. Note here that, for purposes of explanation, each of these figures comes with a combination of two different depictions, the right-hand side one of which is a plan view and the left-hand one is its associated cross-section which corresponds to that along line A-B in FIGS. 13 and 14. Note also that while FIGS. 15A–15G is specifically drawn to only one electron emitter for purposes of illustration, it will be readily recognized by any person skilled in the art that similar devices are to be provided and organized into a 2D-matrix fashion on the same display substrate as shown in FIGS. 12 and 14 when reduction to practice.

Figure 15A:
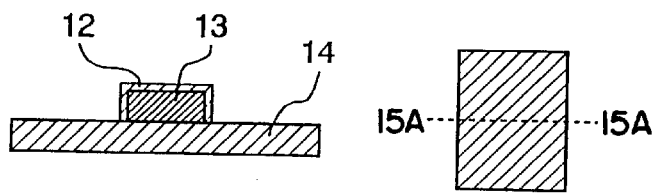
FIGS. 15A through 15G illustrate some of the major steps in the manufacture of a thin-film electron emitter for use in the display device of FIGS. 12A to 14.

First, as shown in FIG. 15A, an insulative substrate 15 made of glass or the like is prepared; then, a metallic thin film, such as Al film, is formed as the base electrode 13 on substrate 14 to a thickness of 300 nm, for example. Formation of this Al film may be done by sputtering, resistive heater deposition, molecular beam epitaxy (MBE), or the like. Next, this Al film is patterned by photolithographical resist formation and subsequent etching treatment, thereby defining therein a stripe-shaped pattern for formation of each base electrode 13. The resist used here may be any kinds of materials insofar as they are suitably adaptable for use with etching treatments, which may in turn be any one of wet etching and dry etching techniques. The base electrode 13 is subject to anodization process forming a dielectric layer 12 which measures 5 to 10 nm in thickness. In this embodiment, the anodization voltage is set at 4 V for formation of dielectric layer of 5.5-nm thick. Resultant structure is as shown in FIG. 15A.

Figure 15B:
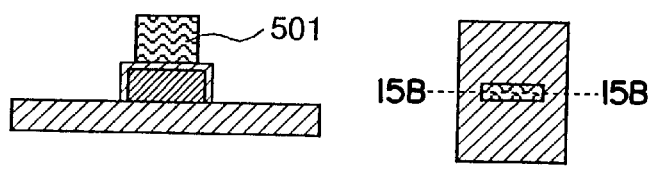
Figure 15C:
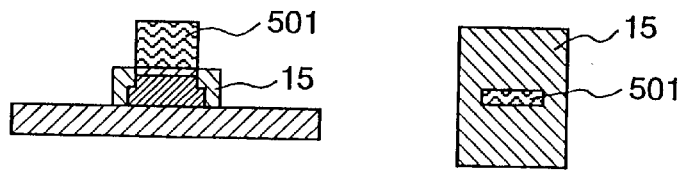

Then, as shown in FIG. 15B, a resist is deposited and irradiated with ultraviolet rays for patterning to thereby obtain a patterned resist mask 501 of FIG. 15B. Quinone diazide-based positive resist material may be employed as the mask. With the patterned resist mask 501 being left thereon, anodization is again carried out forming a protective layer 15. During this second anodization process, anodization current is set at 50 V or therearound for allowing protective film 15 to measure 70 nm in thickness. This is the state shown in FIG. 15C.

Figure 15D:
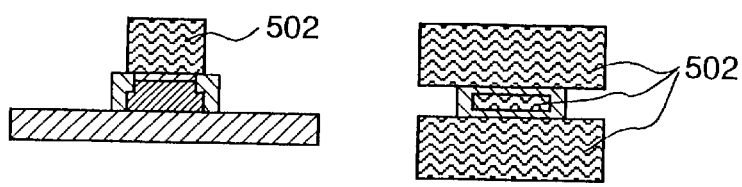
Figure 15E:
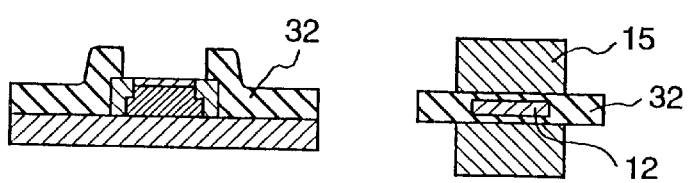

After resist mask 501 is removed using a chosen organic solvent such as acetone, a similar process is applied to form another patterned resist mask 502 as shown in FIG. 15D. A metal film is then formed as the top-electrode bus lines 32 on the entire surface of substrate 14. Preferably, this metal film which will be patterned to define bus lines 32 therein has a multilayer lamination structure which includes a lower layer of certain metal exhibiting excellent adhesion with substrate 14, such as Mo, and an upper layer of hardly oxidizable metals with increased electrical conductivity, which layers are to be sequentially formed by sputtering or deposition. The lower Mo layer may alternatively be made of other metals, including Cr, with enhanced adhesionability with dielectric materials such as Ta, W, Nb or the like. As the material for the upper layer, Pt, Ir, Rh, Ru or the like may be used other than Au. With use of such metals, it is possible to retain an excellent electrical contact with an interface layer 16 to be later formed. Note here that the thickness of the metal film constituting the top-electrode bus lines 32 is modifiable pursuant to case-by-case requirements as to electrical resistivity of lead wires. By way of example, in this embodiment, the Mo film measured 30 nm in thickness whereas Au film was 100 nm thick. Thereafter, the resist mask 502 is removed by a known lift-off techniques using organic solution such as acetone, whereby the resultant structure is as shown in FIG. 15E.

Figure 15F:
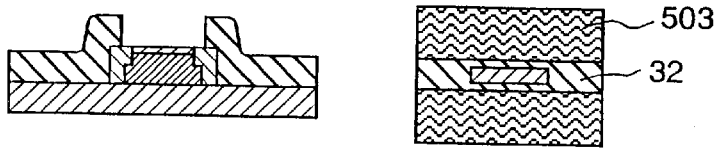

Subsequently, a patterned resist mask 503 is formed as shown in FIG. 15F. The resultant structure is then put in a chosen anodization fluid for effecting anodization. The anodization current here may be similar in potential to that for formation of dielectric layer 12—4 volts, in this embodiment. Dielectric layer 12 which might be somewhat damaged by application of active chemicals, such as developing solution, through several resist-patterning process steps it has experienced until here. To cure this layer, the resultant structure is again subject to anodization prior to formation of its overlying top electrode. Thereafter, an interface layer 16, middle layer 17, and surface layer 18 are then formed in this order. For formation of these films, sputtering is to be used while ensuring that each layer is continuously formed without having to destroy or disturb vacuum environments. In this embodiment, an Ir film of 1-nm thick is formed as interface layer 16; a Pt film of 2-nm thick is as middle layer 17; and an Au film of 3-nm thick as a surface layer 18. Alternatively, like this embodiment, in cases where the bus lines 32 for exclusively supplying an application voltage to the top electrode are specifically employed while the top electrode remains less in area, the top electrode may comprise two layers which are, for example, the Ir interface layer 16 of 1-nm thick and Pt middle layer 17 of 2-nm thick with the surface layer 18 being deleted.

Figure 15G:
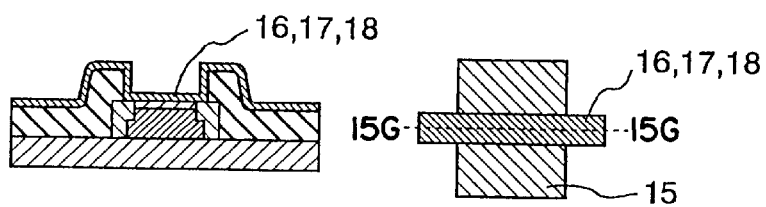

Subsequently, the last formed resist is removed by lift-off techniques using organic solution such as acetone, completing an intended thin-film electron emitter as shown in FIG. 15G. By using the foregoing fabrication scheme, the thin-film electron emitter is successfully formed on the display substrate 14. This electron emitter operates to emit electrons from certain region(s) as defined by the resist pattern 501. Since the thick dielectric film is formed covering peripheral portions of such electron emission part as the protective layer 15, an electric field created between the top and base electrodes will no longer attempt to locally concentrate on the side edges and/or corners of the base electrode, which in turn enables achievement of stable and reliable electron emission characteristics for an extended period of time.

Turning now to FIGS. 12A and 12B, the front plate 110 may be made of transparent materials, including glass. First, a black matrix 120 is formed as shown in FIG. 12B. Black matrix 120 is arranged in layout to reside between adjacent ones of phosphors 114 shown in FIG. 13 although such is not visible in FIG. 13.

The black matrix 120 may be fabricated as follows: deposit on front pate 120 solution of a mixture of graphite particles with polyvinyl alcohol (PVA) and ammonium di-chromate; irradiate UV rays for photographic exposure onto selected portions on each of which black matrix 120 is to be formed; and then, remove away non-exposed portions therefrom.

Then, a red phosphor material 114A is formed. After front plate 110 is deposited on its surface with solution of a mixture of fluorescent particles with PVA and ammonium dichromate, UV rays are then irradiated for exposure onto selected portions being subject to phosphor-material formation; thereafter, any non-exposed portions are removed away using flow of water. In this way, red phosphor material 114A is patterned. The resultant pattern defined is as shown in FIG. 13B. The illustrative pattern is merely one example, and may be freely modified depending upon various display design requirements; for instance, it could be the so-called "RGBG" pattern which uses four neighboring dots for a single picture element or "pixel." The phosphor film is equivalent in thickness to 1.4 to 2 layers of phosphor particles. A green phosphor material 11B and blue one 114C are formed in a way similar to that discussed above. By way of example, the red phosphor material may be $Y_2O_2$:Eu (P22-R), green one may be $Zn_2SiO_4$:Mn (P1-G1), and blue be ZnS:Ag (P22-B). Alternatively, the red phosphor is $YP_{0.65}V_{0.35}O_4$:Eu, green is $Zn_2SiO_4$:Mn (P1-G1), and blue is $(Y,Gd)P_{0.85}V_{0.15}O_4$.

Next, after filming is performed by use of a nitrocellulose film or the like, an Al coat film is entirely deposited on front plate 110 to a thickness of approximately 50 to 300 mm, providing a metal back 122. Thereafter, plate 110 is heated up to 400° C. or near permitting hydrolyzation of the filming film and organic film such as PVA, thereby completing front plate 110.

The resulting front plate 110 and display substrate 14 are assembled together with an appropriate spacer being sandwiched therebetween at the periphery thereof, and are then frit-sealed by use of frit glass. The positional relation of front plate 110 versus substrate 14 for layout is as shown in FIG. 13. In FIG. 14, the planar layout of thin-film electron emitter array thus formed on substrate 14 is depicted in a manner corresponding to the illustration of FIG. 13, although the protective layer 15 and top-electrode surface layer 18 are omitted therefrom for purposes of illustration only.

The distance between spaced-apart front plate 14 and substrate 14 is from 1 to 3 mm. A spacer 60 is inserted therebetween for eliminating destruction of display panel due to application of external force under atmospheric pressure when and after the inside of such panel is vacuumed. Accordingly, in the case of manufacturing display apparatus having its display area of less than or equal to 4 cm (width) 9 cm (length) using a glass plate of 3-mm thick for front plate 110, spacer 60 will no longer be required. This can be said because plate 110 and substrate 14 with such size are capable of withstanding against application of such atmospheric pressure by their own mechanical or physical strength. The spacer 60 when used is arranged to have its shape as shown in FIG. 13. Here, one spacer support member is provided for every set of dots emitting red (R), green (G) and blue (B) light components, that is, for every set of three columns of top electrodes; however, such supports may be reduced in number as far as necessary mechanical strength is expectable. Such spacer 60 may be fabricated by defining, using sand-blasting method, openings or holes of a desired shape in a dielectric plate such as ceramics or glass.

The seal-bonded display panel is vacuumed down at 1 $10^{-7}$ Torr for seal-packaging, thereby completing the display panel that makes use of several thin-film electron emitters embodying the invention.

With this embodiment, since the distance between the front plate 110 and substrate 14 is as long as 1 to 3 mm, it becomes possible to increase an acceleration voltage to the metal back 122 up to 3 to 6 kV. Accordingly, as stated previously, presently available phosphor materials for use in cathode-ray tube (CRT) units may be employed as the phosphor material 114. Voltage waveforms of several drive signals as used in this embodiment is similar to those in the forth embodiment with the acceleration voltage here being replaced by a high potential of 3 to 6 kV.

Sixth Embodiment

Figure 16:
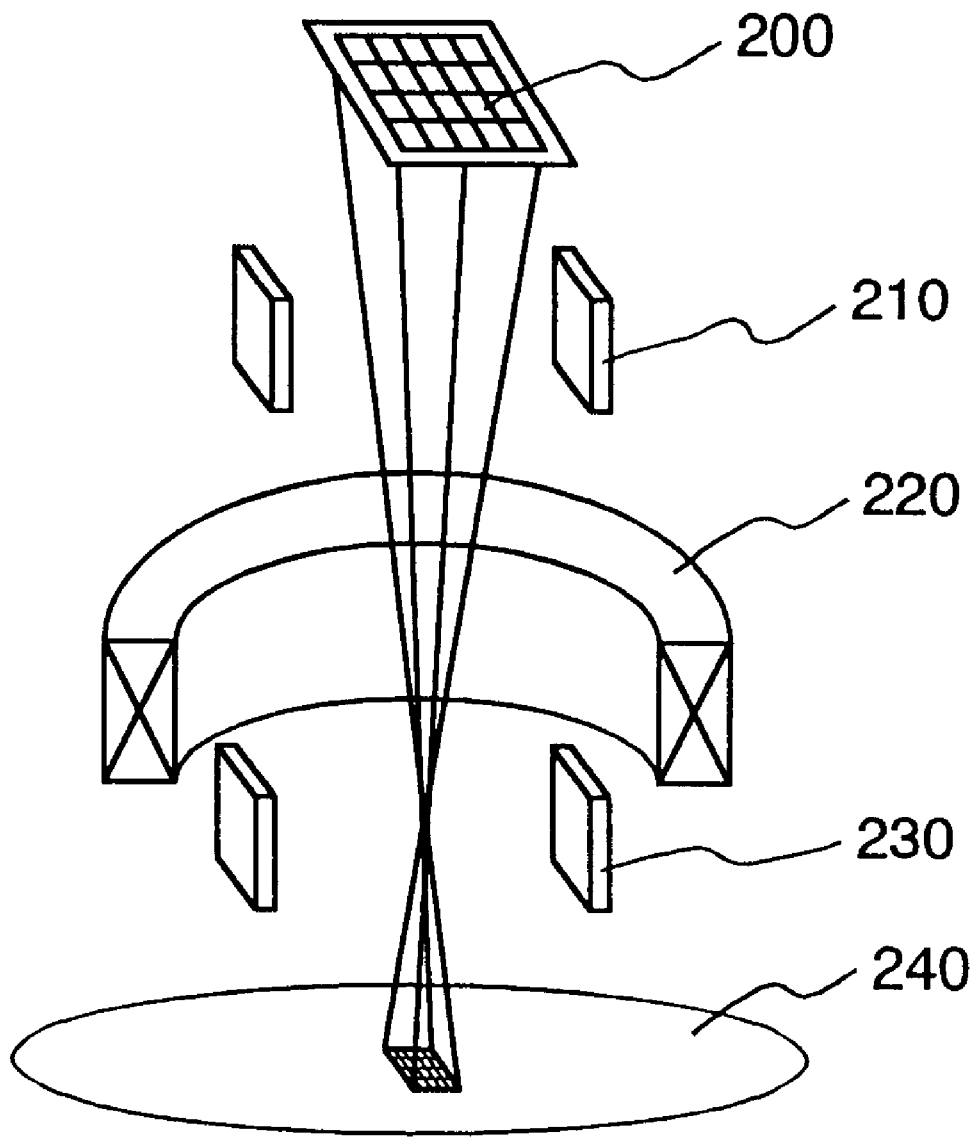
FIG. 16 shows a perspective view of an EB lithography apparatus in accordance with a still further embodiment of the invention.

An EB lithography apparatus in accordance with a sixth embodiment of the invention is shown in FIG. 16. While at least one electron emitter may be employed as the electron source in this EB lithography apparatus, this embodiment is specifically designed to employ a multi-electron emitter assembly 200 which includes an real or 2D matrix of rows and columns of thin-film electron emitters.

The multi-electron emitter unit 200 is similar in electrical driving method to the display apparatus in accordance with the fourth and fifth embodiments, supra, for emitting and projecting onto a target semiconductor wafer 240 an electron beam representative of a predefined pattern that corresponds to desired IC circuitry. The electron beam emitted is then guided to pass through a blanker 210; after leaving this, the resultant beam is condensed by electron lens 220 by $1/1000$ reduction in diameter providing a reduced-diameter spot beam, which is then deflected by deflecting system 230 and next projected onto wafer 240 so that the IC circuitry pattern is transferred thereonto. With the illustrative EB lithography apparatus for simultaneous IC pattern transfer, the required resist exposure remains less in time due to the fact that the emission electron density is high in addition to its capability of transferring plural IC patterns onto wafer 240 at a time. This may enable throughput to be much improved as compared with prior art EB systems.

All publications and patent applications mentioned in this specification are incorporated herein by reference to the same extent as if each was specifically and individually indicated to be incorporated by reference. Also, the entire disclosure of Japanese Patent Application (JPA) No. 8-314502 filed on Nov. 26, 1996 including specification, claims, drawings and summary are incorporated herein by reference in its entirety.

While the invention has been particularly shown and described with reference to preferred embodiments thereof, it will be understood by those skilled in the art that various alterations, modifications and improvements will readily occur to those skilled in the art. Such alterations, modifications, and improvements are intended to be part of this disclosure, and are intended to be within the spirit and scope of the invention. Accordingly, the scope of the invention should not be limited by the particular embodiments described herein but should be only defined in the appended claims and equivalents thereto.

What is claimed is:

1. A thin-film electron device comprising:
 a multilayer thin-film structure including upper and lower electrodes with an insulative layer laid therebetween;
 said upper and lower electrodes receiving a voltage of a polarity with respect to the upper electrode allowing said upper electrode to emit electrons from a surface thereof into a vacuum;
 said upper electrode having a two-layer structure including a first layer formed on said insulative layer and a second layer stacked on said first layer; and
 said first layer being made of a chosen material being greater in sublimation enthalpy than said second layer.

2. The device of claim 1 wherein said first layer is equal to or less than three (3) nanometers in thickness.

3. The device of claim 1 further comprising:
 a dielectric protective layer provided between said upper electrode and side edges and corners of said lower electrode, said protective layer being greater in thickness than said insulative layer.

4. The device of claim 1 wherein said lower electrode is comprised of a metallic material.

5. The device of claim 1 wherein said lower electrode is comprised of a semiconductive material.

6. A thin-film electron emission device comprising:
 a multilayer thin-film structure including upper and lower electrodes with an insulative layer sandwiched therebetween;
 said upper and lower electrodes adapted to receive a voltage of a polarity with respect to the upper electrode allowing said upper electrode to emit electrons from a surface thereof to a vacuum;
 said upper electrode having a three-layer structure of a first layer formed on said insulative layer, a second layer stacked on said first layer and a third layer stacked on said second layer; and
 said second layer being less in sublimation enthalpy than said first layer and greater than said third layer.

7. The device of claim 6 wherein said second layer comprises platinum (Pt).

8. A thin-film electron emmitter device comprising:
 a multilayer thin-film structure including upper and lower electrodes with an insulative layer laid therebetween;
 said upper and lower electrodes adapted to externally receive a voltage of a polarity with respect to the upper electrode allowing said upper electrode to emit electrons from a surface thereof to a vacuum;
 said upper electrode having a three-layer structure including a first layer formed on said insulative layer, a second layer stacked on said first layer and a third layer stacked on said second layer; and
 said first layer being made of one selected from the group consisting of zirconium (Zr), hafnium (Hf), ruthenium (Ru), molybdenum (Mo), iridium (Ir), niobium (Nb), tantalum (Ta), rhenium (Re), osmium (Os), and tungsten (W) or an alloy of plural elements as selectes therefrom;
 said second layer comprising platinum (Pt); and
 said third layer being made of one selected from the group consisting of gold (AB), silver (Ag) and copper (Cu) or an alloy of plural ones as selected therefrom.

9. A thin-film electron emission device comprising:
 a multilayer thin-film structure including upper and lower electrodes with an insulative layer therebetween;
 said upper and lower electrodes adapted to receive a voltage of a polarity with respect to the upper electrode allowing said upper electrode to emit electrons from a surface thereof to a vacuum;
 said upper electrode having a two-layer structure of a first layer formed on said insulative layer and a second layer stacked on or above said first layer;
 said first layer being made of platinum (Pt); and
 said second layer being made of a material being less in sublimation enthalpy than said platinum.

10. A thin-film electron emission device comprising:
 a multilayer thin-film structure including upper and lower electrodes with an insulative layer therebetween;
 said upper and lower electrodes adapted to receive a voltage of a polarity with respect to the upper electrode allowing said upper electrode to emit electrons from a surface thereof into a vacuum;
 said upper electrode having a two-layer structure including a first layer formed on said insulative layer and a second layer stacked on or above said first layer; and said first layer being made of certain material being greater in sublimation enthalpy than said second layer; and a power supply lead layer electrically coupled to said upper electrode for supply of a voltage to said upper electrode.

11. The device of claim 10 wherein said second layer comprises platinum (Pt).

12. A device according to claims 1, 6, 8, 9 or 10, wherein said polarity with respect to the upper electrode is a positive polarity.

13. An electron emitter application apparatus comprising an array of plural thin-film electron emission devices, each said device comprising:
   a multilayer thin-film structure including upper and lower electrodes with an insulative layer therebetween;
   said upper and lower electrodes receiving a voltage of a polarity with respect to the upper electrode allowing said upper electrode to emit electrons from a surface thereof into a vacuum;
   said upper electrode having a two-layer structure of a first layer formed on said insulative layer and a second layer as sequentially stacked on said first layer; and
   said first layer being made of a material being greater in sublimation enthalpy than said second layer.

14. An electron emitter application apparatus comprising:
   a thin-film electron emitter substrate as an electron source of said apparatus, said substrate having thereon an array of rows and columns of thin-film electron emitter devices; and
   each said device comprising:
      a multilayer thin-film structure including upper and lower electrodes with an insulative layer therebetween,
      said upper and lower electrodes receiving a voltage of a polarity with respect to the upper electrode allowing said upper electrode to emit electrons from a surface thereof into a vacuum,
      said upper electrode having a two-layer structure including a first layer formed on said insulative layer and a second layer stacked on said first layer, and
      said first layer being made of a material being greater in sublimation enthalpy than said second layer.

15. A display apparatus comprising:
   a thin-film electron emitter device including,
   a multilayer thin-film structure having upper and lower electrodes with an insulative layer therebetween,
   said upper and lower electrodes receiving a voltage of a polarity with respect to the upper electrode allowing said upper electrode to emit electrons from a surface thereof into a vacuum,
   said upper electrode having a two-layer structure including a first layer formed on said insulative layer and a second layer stacked on said first layer, and
   said first layer being made of a material being greater in sublimation enthalpy than said second layer;
   a plate having a phosphor film thereon; and
   said thin-film electron emitter and said plate being disposed causing electrons emitted from said thin-film electron emitter to hit said phosphor film.

16. The apparatus of claim 15 wherein said electron emitter and said plate are sealed with a spacer placed therebetween, said spacer ranging from 1 to 3 millimeters (mm) in thickness.

17. An electron-beam lithography apparatus comprising:
   at least one thin-film electron emitter device including,
   a multilayer thin-film structure having upper and lower electrodes with an insulative layer therebetween,
   said upper and lower electrodes receiving a voltage of a polarity with respect to the upper electrode allowing said upper electrode to exit electrons from a surface thereof into a vacuum,
   said upper electrode having a two-layer structure of a first layer formed on said insulative film and a second layer stacked on said first layer, and
   said first layer being made of a material being greater in sublimation enthalpy than said second layer; and
   an electron lens located relative to said thin-film electron emitter device to allow electrons emitted from said thin-film electron emitter device to pass therethrough.

18. An electron beam lithography apparatus comnprising:
   a substrate;
   an array of thin-film electron emitter devices on said substrate, each of said device comprising,
   a multilayer thin-film structure including upper and lower electrodes with an insulative layer therebetween,
   said upper and lower electrodes receiving a voltage of a polarity with respect to the upper electrode allowing said upper electrode to emit electrons from a surface thereof into a vacuum,
   said upper electrode having a two-layer structure including a first layer formed on said insulative layer and a second layer stacked on said first layer, and
   said first layer being made of a material being greater in sublimation enthalpy than said second layer; and
   an electron lens located relative to at least one of said thin-film electron emitter devices to allow electrons emitted from said thin-film electron emitter devices to pass therethrough.

19. An electron beam lithography apparatus comprising:
   a substrate; and
   an array of rows and columns of thin-film electron emitter devices on said substrate, each said device comprising,
   a multilayer thin-film structure including upper and lower electrodes with an insulative layer therebetween,
   said upper and lower electrodes receiving a voltage of a polarity with respect to the upper electrode allowing said upper electrode to emit electrons from a surface thereof into a vacuum,
   said upper electrode having a two-layer structure of a first layer formed on said insulative layer and a second layer stacked on said first layer, and
   said first layer being made of a material being greater in sublimation enthalpy than said second layer; and
   an electron lens located relative to at least one of said thin-film electron emitter devices to allow electrons emitted from said thin-film electron emitter device to pass therethrough.

20. An electron emitter application apparatus comprising an array of plural thin-film electron emission devices, each said device comprising:
   a multilayer thin-film structure including upper and lower electrodes with an insulative layer therebetween;
   said upper and lower electrodes receiving a voltage of a polarity with respect to the upper electrode allowing said upper electrode to emit electrons from a surface thereof into a vacuum;

said upper electrode having a three-layer structure of a first layer formed on said insulative layer, a second layer stacked on said first layer and a third layer stacked on said second layer; and said second layer being made of a material having a sublimation enthalpy smaller than said first layer and greater than said third layer.

21. An electron emitter application apparatus comprising:

a thin-film electron emitter substrate as an electron source of said apparatus, said substrate having thereon an array of rows and columns of thin-film electron emitter devices; and each said device comprising, a multilayer thin-film structure including upper and lower electrodes with an insulative layer therebetween, said upper and lower electrodes receiving a voltage of a polarity with respect to the upper electrode allowing said upper electrode to emit electrons from a surface thereof into a vacuum, said upper electrode having a three-layer structure including a first layer formed on said insulative layer, a second layer stacked on said first layer and a third layer stacked on said second layer; and said second layer being made of a material having a sublimation enthalpy smaller than said first layer and greater than said third layer.

22. A display apparatus comprising:

a thin-film electron emitter device including, a multilayer thin-film structure haying upper and lower electrodes with an insulative layer therebetween, said upper and lower electrodes receiving a voltage of a polarity with respect to the upper electrode allowing said upper electrode to emit electrons from a surface thereof into a vacuum, said upper electrode having a three-layer structure including a first layer formed on said insulative layer, a secod layer stacked on said first layer and a third layer stacked on said second layer; and said second layer being made of a material having a sublimation enthalpy smaller than said first layer and being greater than said third layer;

a plate having a phosphor film thereon; and said electron emitter and said plate being disposed causing electrons emitted from said electron emitter to hit said phosphor film.

23. The apparatus of claim 22 wherein said electron emitter and said plate are sealed with a spacer placed therebetween, said spacer ranging from 1 to 3 millimeters (mm) in thickness.

24. An electron-beam lithography apparatus comprising:

at least one thin-film electron emitter device including, a multilayer thin-film structure having upper and lower electrodes with an insulative layer therebetween, said upper and lower electrodes receiving a voltage of a polarity with respect to the upper electrode allowing said upper electrode to emit electrons from a surface thereof into a vacuum, said upper electrode having a three-layer structure of a first layer formed on said insulative layer, a second layer stacked on said first layer and a third layer stacked on said second layer; and said second layer being made of a material having a sublimation enthalpy smaller than said first layer and greater than said third layer; and an electron lens located relative to said thin film electron emitter device to allow electrons emitted from said electron emitter device to pass therethrough.

25. An electron beam lithography apparatus comprising:

a substrate;

an array of thin-film electron emitter devices on said substrate, each said device comprising, a multilayer thin-film electron structure including upper and lower electrodes with an insulative layer therebetween, said upper and lower electrodes receiving a voltage of a polarity with respect to the upper electrode allowing said upper electrode to emit electrons from a surface thereof into a vacuum, said upper electrode having a three-layer structure including a first layer formed on said insulative layer, a second layer stacked on said first layer and a third layer stacked on said second layer; and said second layer being made of a material having a sublimation enthalpy smaller than said first layer and greater than said third layer; and an electron lens located relative to at least one of said thin-film electron emitter devices to allow electrons emitted from said thin-film electron emitter device to pass therethrough.

26. An electron beam lithography apparatus comprising:

a substrate; and an array of rows and columns of thin-film electron emitter devices on said substrate, each said device comprising, a multilayer thin-film structure including upper and lower electrodes with an insulative layer therebetween, said upper and lower electrodes receiving a voltage of a polarity with respect to the upper electrode allowing said upper electrode to emit electrons from a surface thereof into a vacuum, said upper electrode having a three-layer structure of a first layer formed on said insulative layer, a second layer stacked on said first layer and a third layer stacked on said second layer; and said second layer being made of a material having a sublimation enthalpy smaller than said first layer and greater than said third layer; and an electron lens located relative to at least one of said thin-film electron emitter devices to allow electrons emitted from said thin-film electron emitter device to pass therethrough.

27. An apparatus according to claims 13, 14, 15, 17, 18, 19, 20, 21, 22, 24, 25 or 26, wherein said polarity with respect to the upper electrode is a positive polarity.

* * * * *